United States Patent [19]

Burgoon

[11] Patent Number: 5,141,083

[45] Date of Patent: Aug. 25, 1992

[54] BRAKE PAD FOR A DISC BRAKE SYSTEM

[76] Inventor: Donald L. Burgoon, 1300 Heatherloch Dr., Gastonia, N.C. 28054

[21] Appl. No.: 515,835

[22] Filed: Apr. 27, 1990

[51] Int. Cl.$^5$ .............................................. F16D 65/00
[52] U.S. Cl. .................................. 188/73.1; 188/234; 188/250 G; 188/250 B
[58] Field of Search ............... 188/250 G, 258, 250 B, 188/234, 73.1; 192/107 R

[56] References Cited

U.S. PATENT DOCUMENTS

| | | | |
|---|---|---|---|
| 1,336,752 | 4/1920 | Muller | 188/234 |
| 2,879,866 | 3/1959 | Newell | 188/234 |
| 4,569,424 | 2/1986 | Taylor | 188/250 G |
| 4,799,579 | 1/1989 | Myers et al. | 192/107 R X |

FOREIGN PATENT DOCUMENTS

| | | | |
|---|---|---|---|
| 618550 | 4/1961 | Canada | 188/250 G |
| 2423870 | 12/1974 | Fed. Rep. of Germany | 188/250 G |
| 2427690 | 12/1975 | Fed. Rep. of Germany | 188/250 G |
| 687714 | 3/1965 | Italy | 188/250 G |

Primary Examiner—Robert J. Oberleitner
Assistant Examiner—Lee W. Young
Attorney, Agent, or Firm—Dority & Manning

[57] ABSTRACT

A pad assembly for a disc braking system, including a backing plate having protrusions extending upwardly therefrom and with irregular surfaces and a composite brake pad molded in situ onto the braking plate, the composite material of the pad encapsulating the protrusions so that upon thermal expansion during use, the pad will not separate from the backing plate.

9 Claims, 2 Drawing Sheets

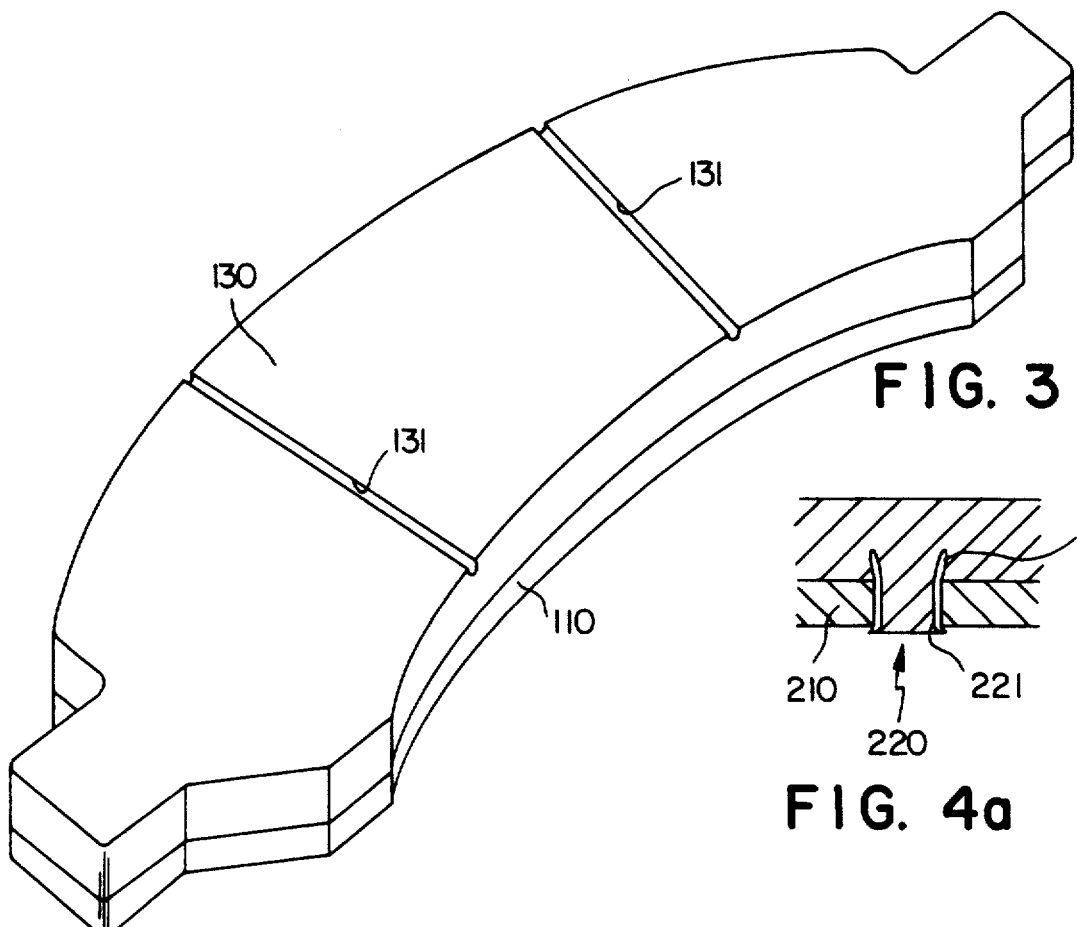
FIG. 3
FIG. 4a
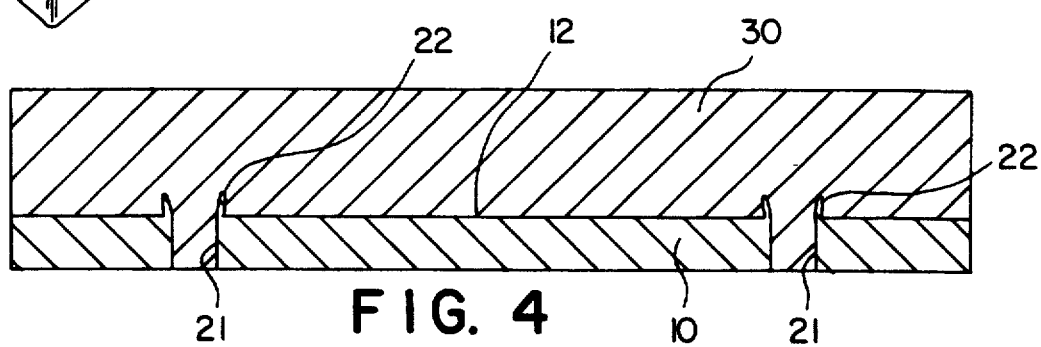
FIG. 4
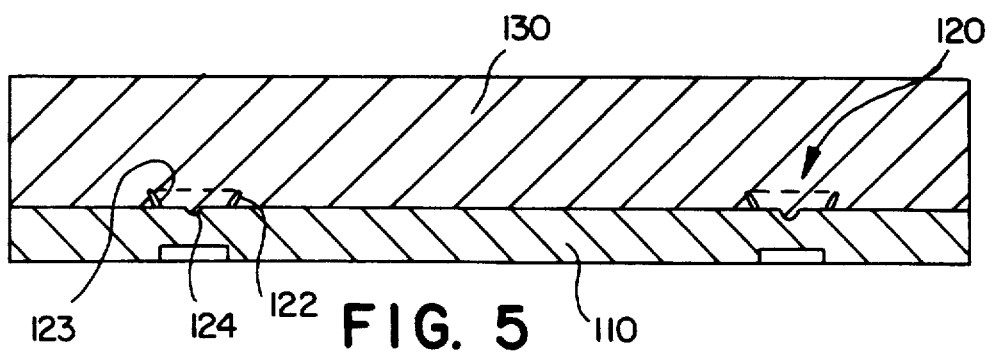
FIG. 5

BRAKE PAD FOR A DISC BRAKE SYSTEM

The present invention relates to a disc type braking system, and more particularly to an improved brake pad for use in such a system.

Disc type braking systems have evolved for use in automobiles, trucks and other vehicles as an improved means for braking of the vehicles due primarily to the improved efficiency of the disc type system. In disc braking systems, generally speaking, a pad of material having appropriate friction characteristics is brought into surface contact with a rotating disc or rotor to bring about a reduction in speed and ultimate stoppage of the vehicle. Obviously, significant forces are involved in applying the pad to the rotor, and due to the relative movement therebetween during engagement, extreme temperatures, up to about 1200° F. and even higher, can be and are generated. Moreover, depending upon the size and/or the payload carried by certain vehicles, large amounts of mass are often involved which must be stopped thus involving significant pressures and/or temperatures, and more than would be involved with the use of a disc braking system for automotive vehicles, for example.

Since the advent of the disc braking system per se, continued development has existed seeking improvement not only in braking power, but also in useful life or longevity of the system. Generally speaking, as disc braking systems are employed, wear occurs across the contact surface of the pad, and once the pad has been consumed, a new pad must be replaced therefor to avoid damage to the disc by metallic backing plates or other pad supporting elements. Furthermore, due, as mentioned above, to the high temperatures involved, the selection of materials from which the braking pads are manufactured becomes important to avoid degradation of the pad per se, or to the surface of the pad which could cause the pad to deteriorate in general or to lose its frictional effectiveness when brought into contact with the disc. As a consequence, significant effort has been expended in the area of the production of composite pads which not only will experience proper frictional engagement with the disc, but will also, without deterioration, withstand the temperatures generated during braking.

In looking at disc braking systems across the board, it may readily be seen that whereas for normal automotive use, a disc braking system undergoes certain rigors, the demands on a disc braking system for yet other vehicles greatly exceed those of the standard automotive use as mentioned above. Examples of such uses where extreme conditions exist are found for the family vehicle type over terrain where constant braking may be required, e.g. descending from a mountain top or the like; heavy industrial equipment where extremely heavy payloads are involved such as might be found on transport vehicles, on dump trucks, front end loaders and other heavy equipment, in a racing environment where high speeds and high braking demands are important; and likewise in school buses, commercial buses, and the like.

Composite disc pads have been molded in situ to a backing plate or backing support so as to present a proper pad to a rotor to impart the necessary braking action while at the same time withstanding the temperatures generated during braking. Disc pads have also been separately produced and adhesively or otherwise secured to a support therefor.

In use, disc brake pads according to the prior art have experienced problems even though high tech materials have been utilized in producing the backing plates as well as the brake pads themselves. In this regard, typically the composite brake pads contain resinous material such as phenolics, iron powder, steel or carbon fibers, carbon powder, and a catalyst such as barium sulfate. The composition is then molded in a compression molding press. Such pads once molded have been glued or otherwise secured to a backing plate or have been molded in situ to the plate where holes have been provided in the backing plate to receive the composite material during molding in an attempt to better secure the pad to the backing plate. In like fashion, metal wire has been secured to a backing plate with the composite pad produced in situ thereabout, again attempting to better secure the pad to the plate.

With composite pad materials of the type described above and with metal backing plates, once the brake plate assembly undergoes use in a braking operation, as mentioned above significant heat is generated during the operation. One problem that has existed in the prior art has come about as a result of differential thermal expansion between the composite pad material and the backing plate. Particularly, during the manufacture of the pad assembly, upon molding under heat and pressure, a certain amount of shrinkage of the pad materials occurs. Thereafter, when the pad becomes heated during use the composite materials expand, but at a different rate than that of the metal backing plate such that separation may occur between the pad and the plate. If separation does occur, then, of course, the pad becomes unsecured from the backing plate and is no longer available for braking contact with the brake rotor leading to failure of the system.

The present invention represents significant improvement over the prior art as noted above and is not believed to be anticipated nor rendered obvious thereby.

SUMMARY OF THE INVENTION

It is an object of the present invention to provide an improved brake pad assembly for a disc braking system.

Another object of the present invention is to provide an improved composite brake pad assembly for a vehicular braking system.

Yet another object of the present invention is to provide an improved brake pad assembly where the composite brake pad is molded in situ to a backing plate in a fashion that upon differential thermal expansion during use, the braking pad will not separate from the backing plate.

Generally speaking, the improved brake pad according to the present invention comprises a backing plate of a predetermined shape, the backing plate having a plurality of protrusions extending upwardly therefrom, the protrusions having an irregular shape, and a composite pad material molded in situ to the backing plate, the composite material surrounding the protrusions and irregularities and being interlocked therewith for improved retention of the formed pad thereto.

More specifically, with a metal backing plate, and with protrusions extending outwardly from a front surface of the backing plate and having irregularities thereon, a composite pad material may be molded in situ thereabout whereupon during initial shrinkage of the material during molding, the material shrinks about the irregularities of the protrusions so as to be mechanically interlocked therewith, so that upon subsequent thermal expansion, the composite pad material will not separate from the protrusions and therefore remains affixed to the backing plate, and thereafter reassumes a tightened position upon cooling.

The protrusions from the metal backing plate may be of unitary construction with the backing plate as being punched therefrom or molded or otherwise formed therewith or may be separate elements secured to the backing plate. The irregularities in the protrusions can be of various designs and shapes such as flares, crimps, twists, knurls, wedges, splits, barbs or otherwise so that during formation of the pad, the composite material shrinks around the protrusion and will not slip off or away from the protrusion upon subsequent thermal expansion.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, therein an example of the invention is shown and wherein:

FIG. 3 is a perspective view of a brake pad assembly according to the present invention;

FIG. 4 is a partial vertical cross-sectional view of a brake pad assembly according to the present invention and exemplary of use of a backing plate as shown in FIG. 1;

FIG. 4a is a partial vertical cross-section of yet a further embodiment of the present invention; and FIG. 5 is a partial cross-sectional view of a brake pad assembly according to the present invention and exemplary of use of a backing plate as illustrated in FIG. 2.

DESCRIPTION OF THE PREFERRED EMBODIMENTS

Figure 1:
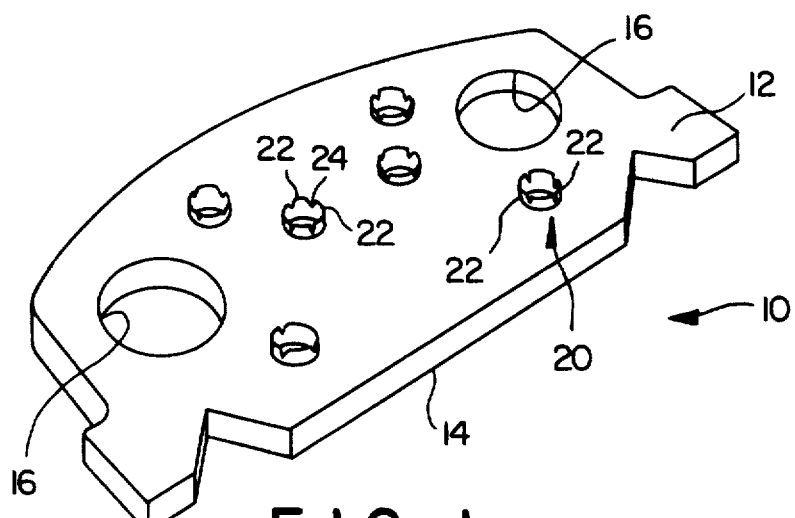
FIG. 1 is a perspective view of a backing plate according to the present invention.

Referring to the FIGS., preferred embodiments of the present invention will now be described in detail. Referring to FIG. 1, a backing plate generally 10 is illustrated having a front surface 12 and a rear surface 14 and having a particular predetermined peripheral configuration for use in conjunction with a specific braking system. Backing plate 10 further defines a plurality of openings 16 therein which receive molded pad material during formation of the pad. Plate 10 further defines a plurality of spaced apart protrusions generally 20 located on and extending upwardly from frontal surface 12. Each protrusion 20 in this particular embodiment has a plurality of segments 22 in generally spaced apart relation around protrusion 20 with each adjacent segment 22 defining a space or indention 24 therebetween. Furthermore, protrusion segments 22 are slightly flared outwardly. Referring also to FIG. 4, a composite brake pad material generally 30 is shown molded in a shape conforming to the outer periphery of backing plate 10 and which totally covers the surface of same. Also in practice, a plurality of grooves 131 are provided across the face of pad 30 to assist in control of thermal expansion (see FIG. 3).

As can be seen, particularly with respect to FIG. 4, braking pad 30 has been molded in situ atop a backing pad 10 as illustrated in FIG. 1 with the composite material passing through openings 21 defined axially with respect to protrusions 20 and encapsulating protrusion segments 22. The composite material would also fill in the holes 16 in backing plate 10. As mentioned above, during the molding process which normally involves heat and pressure, there is a shrinkage of composite material of pad 30 such that the portion of brake pad 30 immediately surrounding protrusion segments 22 shrinks into holding contact with same to facilitate securement of braking pad 30 to backing plate 10. As also illustrated, protrusions 20 have been produced to be of unitary construction with backing plate 10 though could be separate elements as shown in FIG. 4a where the protrusion 220 has been pressed into an opening 221 of a plate 210, has a flared upper end 222 and is flared on an underside to secure against removal of same.

Figure 2:
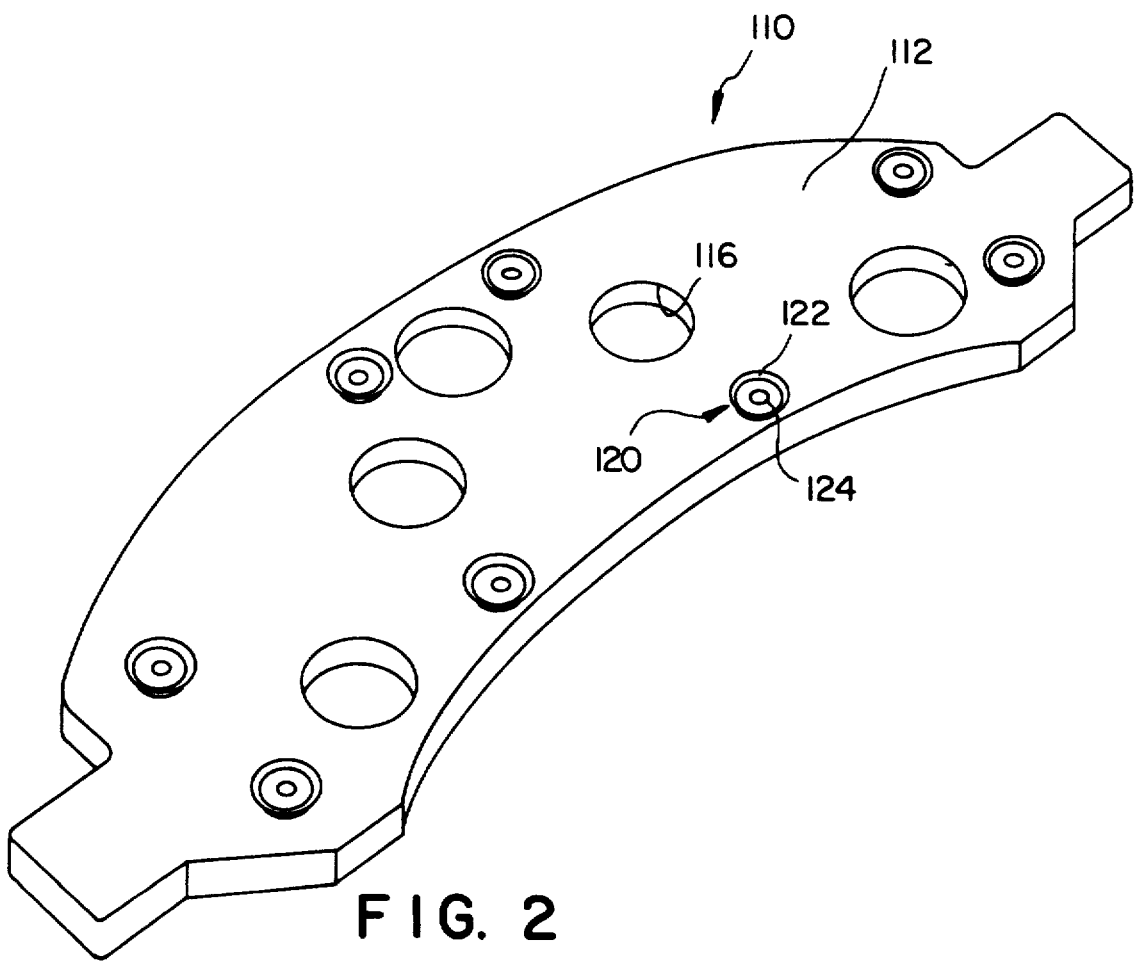
FIG. 2 is a perspective view of a most preferred backing plate according to the present invention.

Making reference now to FIG. 2, a backing plate generally indicated as 110 is illustrated having a frontal surface 112 which defines a plurality of openings 116 thereacross and has a particular shape, again to facilitate use with a specific braking system. Backing plate 110 has a plurality of protrusions 120 extending upwardly from an upper surface 112 thereof and representing a continuous circle having a flared upper edge 122 with a slight detent 124 located in a bottom of an opening 123 defined by flared sections 122. As can be seen, a plurality of such protrusions 120 are located about the upper surface 112 of backing plate 110 so as to receive a composite material therearound. FIG. 3 includes a backing plate 110 having protrusions as illustrated in FIG. 2 and with a brake pad 130 secured atop same, having been molded in situ thereto according to the shape and dimensions of backing plate 110. Grooves 131 across pad 130 are provided to assist in control of thermal expansion of material of pad 130. As seen in FIG. 5, brake pad 130 is secured to backing plate 110 in such a fashion that composite material of the braking pad 130 fills up the openings 123 defined by flared flanges 122 of projections 120 and is cured in contact therewith, shrinking into tight contact with protrusions 120.

Insofar as the backing plates according to the present invention are concerned, same are generally metal or metal containing composites, but could be of any composition that will withstand the rigors of the braking system and which can be manipulated so as to provide the necessary protrusions from an upper surface therefrom. Conversely, the materials from which the brake pad is produced, again as mentioned above, is preferably a resinous composite that is designed to afford a proper frictional contact with the brake rotor of the braking system with which it is employed and which will withstand the frictional and thermal rigors of the system without degradation, cracking, chipping, separation or the like, any of which would decrease the effectiveness of the braking system and result in a failure thereof.

A typical composite material such as used according to the present invention would include 12 to 20 weight percent resin, such as a phenolic resin; 28 to 32 weight percent iron powder; 12 to 14 weight percent reinforcing fibers which may be steel, carbon, ceramic, organic or the like fibers, 38 to 40 weight percent of carbon powder and 5 to 20 weight percent of a catalyst such as barium sulfate. With the mixture produced according to conventional mixing techniques for such a material, the backing plate is placed into a mold having a like configured perimeter as that of the backing plate and the composite material is poured thereover to a proper thickness. The mold is then closed and subjected to temperature and pressure as necessary to polymerize the particular resin being employed and to form the composite brake pad in situ onto the backing plate. From a standpoint of the exemplary composition noted above where a phenolic resin is employed, temperatures in a range of about 175° to about 425° F. would be involved in the molding process as well as pressures in excess of 1000 pounds per square inch. During the molding process for formation of the brake pad, the material as noted above shrinks about the protrusions and irregularities depending upwardly from the upper surface of the backing plate into tight conformity with same so as to securely lock the braking pad to the backing plate.

It should be pointed out that though an exemplary composite composition is set forth above, the present invention is not intended to be restricted thereto, but instead any composite material that may be produced in situ about the backing plate where protrusions according to the present invention are involved would be expected to come within the purview of the present invention.

In use, the brake pads (composite pad secured to backing plate) are mounted for actuation by one or more caliper cylinders. Upon demand, the cylinders move the pad into contact with the rotor to effectuate braking, and hold contact so long as the brake pedal, lever, or the like is engaged. Consequently, upon operative contact between the rotor or disc and the pad in addition to the thermal conditions, significant shear and other mechanical forces are encountered and must be withstood for a successful system.

In looking therefore to the performance of brake pad assemblies according to the present invention, comparative tests were conducted with a plurality of samples to determine the bond performance of the composite pad to the backing plate. The assemblies compared were of the style shown in FIG. 2, with and without the protrusions. Once the pad assemblies were produced, the various samples were placed in a fixture, holding the braking plate, and a force was applied against an edge of the molded pad to determine its resistance to shear forces. Sixteen samples of prior art assemblies and eleven samples embodying the present invention were tested. The samples of brake pad assemblies using a backing plate according to FIG. 2 required an average gross shear force of 15,459 pounds (range of 13,287 to 18,376) compared to an average of 12,297 pounds of force (range of 9,188 to 14,418) for the prior art assemblies to separate the pad from the backing plate. The average shear force calculated to be 967 pounds per square inch of backing plate for the present invention and 769 pounds per square inch for the prior art structure. Overall therefore a 25.71 percent increase in bond performance was realized where the mechanical retention system according to the present invention was employed.

It will be understood, of course, that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

What is claimed is:

1. An improved pad for use with a disc braking system comprising:
   (a) a backing plate;
   (b) a plurality of protrusions extending outwardly from said backing plate; said protrusions being constructed unitarily with said backing plate, each of said protrusions defining an opening therein, said opening further defining a detent in the bottom thereof so that a material shrunk around said protrusions is mechanically interlocked therewith and held affixed to said backing plate; and
   (c) a composite pad material molded in situ to said backing plate, said composite pad material surrounding said protrusions and being interlocked therewith for improved retention of said composite pad material thereto.

2. An improved pad as defined in claim 1 wherein said protrusions have an outer portion which flares outwardly from said backing plate to define said opening.

3. An improved pad as defined in claim 1 wherein different size protrusions are provided about said plate.

4. An improved pad as defined in claim 1 wherein said backing plate further defines a plurality of openings therethrough.

5. An improved pad as defined in claim 1 wherein said protrusions are hollow and define a plurality of arcuate segments, an upper end of said segments being rounded.

6. An improved pad as defined in claim 5 wherein said upper ends of said arcuate segments are flared outwardly.

7. An improved pad for use with a disc braking system comprising a backing plate, said backing plate being adapted for connection to a portion of said braking system for presenting said pad to a rotor of said disc braking system, said backing plate having a rear surface and a front surface and having a plurality of protrusions formed unitarily with said front surface, each of said protrusions being formed so as to define a opening therein and present an irregular shape therearound, said opening defining a detent in the bottom thereof; and a composite material molded in situ to said front surface of said backing plate and encapsulating said protrusions when molded therearound so that said protrusions hold said composite material to said backing plate and prevent movement of said composite material away from said backing plate during periods of thermal expansion experienced during use of said disc braking system.

8. An improved pad as define din claim 7 wherein said composite material is produced from resinous and metallic materials.

9. An improved composite pad as defined in claim 7 wherein said backing plate defines a plurality of openings therein, said openings being filled by said composite material during molding.

* * * * *